Patented Feb. 22, 1938

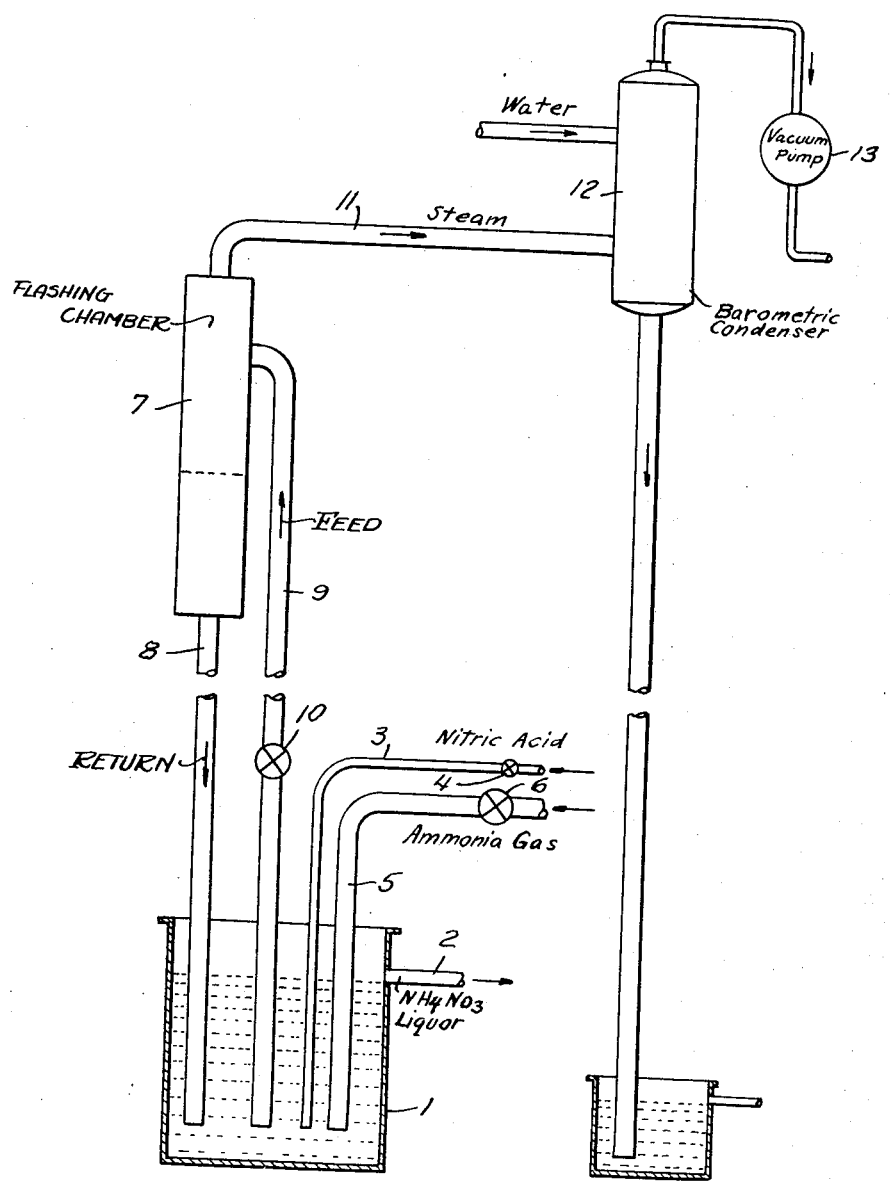

2,109,347

UNITED STATES PATENT OFFICE 2,109,347

PROCESS AND APPARATUS FOR THE PRODUCTION OF SALTS

Herman Albert Beekhuis, Jr., Syracuse, N. Y., assignor, by mesne assignments, to The Solvay Process Company, New York, N. Y., a corporation of New York Application June 13, 1931, Serial No. 544,112

20 Claims. (Cl. 23—103)

This invention relates to a process for the production of salts. More particularly, this invention relates to a process and apparatus for reacting an acid and ammonia to produce an ammonium salt.

It is well known that ammonia is rapidly absorbed by an aqueous solution of an acid with the formation of a solution of an ammonium salt. The reaction taking place between the ammonia and, for example, nitric acid, may be expressed by the equation:

$$NH_3 + HNO_3 = NH_4NO_3$$

As a result of this chemical reaction, large amounts of heat are liberated. If nitric acid of a relatively high degree of concentration is employed, the heat evolved by the neutralization of the acid with the ammonia is sufficient to boil the acid and if this boiling is permitted to take place during the neutralization of the acid, a serious loss of material ensues by volatilization of the acid and/or by ammonia passing unabsorbed through the hot boiling liquid. On the other hand, if the nitric acid is employed diluted with sufficient water to absorb the heat of neutralization without the temperature of the solution being raised to its boiling point, a relatively dilute ammonium nitrate solution is obtained which, for many purposes, is not as desirable as a more concentrated solution. In order to obtain a concentrated solution or a solid product, large amounts of energy must be expended to evaporate the excess water. In order to obviate the difficulties inherent in diluting the nitric acid with water, it has heretofore been proposed to dilute a concentrated nitric acid with a solution of ammonium nitrate and introduce ammonia gas into this dilute acid solution. This expedient, while it obviates the losses incurred in an operation wherein the acid solution boils, does not make use of the heat liberated as a result of the chemical reaction.

It is an object of this invention to provide an economic process for reacting an acid and ammonia to produce a relatively concentrated solution of an ammonium salt whereby the heat of reaction serves to evaporate water introduced with the acid or with the ammonia, without resulting in excessive losses of the reacting materials. It is likewise an object of this invention to provide a process whereby relatively concentrated acids may be reacted with ammonia and the heat liberated by the chemical reaction may be conserved and utilized for removing water from the reacting materials without excessive heating of the same occurring to make difficult the regular conduct of the reaction or to cause losses of reactants. It is a further object of this invention to provide a new apparatus particularly suitable for the production of a concentrated solution of an ammonium salt by reaction of an acid and ammonia. Other objects of the invention will in part be obvious and will in part appear hereinafter.

I have discovered that an ammonium salt, for example ammonium nitrate, may be readily and economically manufactured by simultaneously introducing an acid, more specifically, nitric acid, and ammonia into a pool of liquid comprising an aqueous solution of the corresponding salt which serves as a medium for the reaction between the ammonia and the nitric acid and that a relatively concentrated solution of the salt may be prepared without excessive losses of the reacting materials by circulating a portion of the liquid to a flashing chamber wherein water is evaporated from the salt solution to concentrate and to cool it. The thus cooled solution may be recirculated back to the pool of solution into which the acid and ammonia are introduced. The heat of reaction of the acid and ammonia may be continuously removed from the pool of liquor, so as to maintain the liquor in which the reaction takes place at a temperature sufficiently below its boiling point to preclude losses of reactants from the process. I have discovered that by thus preventing a boiling of the solution in which the reaction between nitric acid and ammonia, for example, is carried out, not only may a loss of the reactants due to volatilization of the same be minimized, but the formation of a fume of ammonium nitrate itself which would be carried out of the solution in the bubbles of escaping steam is obviated by employing the process of this invention wherein the pool of liquor in which the nitric acid and ammonia react is maintained at a temperature below its boiling point. I have discovered that this formation of ammonium nitrate fumes is an important cause of loss of material in processes heretofore employed for the production of ammonium nitrate, and to the prevention of this fume formation and escape I attribute important practical advantages inherent in my new process. Further, I have discovered that by continually circulating a portion of the ammonium nitrate liquor from the pool into which the nitric acid and ammonia are introduced to a flashing chamber and cooling the circulating liquor by evaporation at a temperature below the boiling point of the liquor at atmospheric pressure, the heat of reaction of the nitric acid and ammonia may be economically utilized to evaporate water from the ammonium nitrate solution and a highly concentrated solution may be readily obtained.

For a fuller understanding of the nature and objects of this invention, reference should be had to the following detailed description of a process for the production of ammonium nitrate and of an apparatus suitable therefor, in conjunction with the accompanying drawing which shows an apparatus suitable for reacting nitric acid with gaseous ammonia to produce a solution of ammonium nitrate.

Referring to the drawing, the numeral 1 indicates a reaction vessel provided with an overflow 2. A pipe 3 provided with a valve 4 enters vessel 1 and terminates in an open end above the bottom of the vessel. A gas pipe 5 provided with a valve 6 likewise enters vessel 1 and terminates therein near the bottom of the vessel. A flashing chamber 7 is disposed at an elevation above vessel 1. A pipe 8 leads from the bottom of chamber 7 to within vessel 1 and a second pipe 9 directly communicates between vessel 1 and the upper portion of chamber 7. A valve 10 is provided for controlling the flow of liquid through pipe 8. A gas pipe 11 leads from the top of chamber 7 to condenser 12 connected with a vacuum pump 13, the chamber, condenser and vacuum pump constituting a flash evaporator.

In employing the apparatus shown in the drawing for the production of ammonium nitrate, a solution of ammonium nitrate in water containing about 1% free nitric acid may be introduced into reaction vessel 1. With valve 10 closed, vacuum pump 13 is operated to draw a portion of the liquor from vessel 1 up through pipe 8 into the bottom of chamber 7. Valves 4 and 6 are then opened to admit nitric acid and ammonia gas from containers for the same, not shown in the drawing, into the ammonium nitrate solution in vessel 1. The rate of flow of ammonia and nitric acid is regulated by adjusting valves 4 and 6 so that a substantially constant acidity of the solution in vessel 1 is maintained at about 1% free acid. The incoming nitric acid and ammonia react in the pool of ammonium nitrate solution in vessel 1 to form ammonium nitrate, and the heat liberated as a result of this reaction warms the nitrate liquor. When the liquor in vessel 1 has become sufficiently heated, as for example, to a temperature of about 70° C., valve 10 is opened. As a result of the vacuum maintained in chamber 7 by means of vacuum pump 13, the warm solution rises through pipe 9 past valve 10 and upon reaching a point in the pipe at which the pressure is sufficiently below atmospheric to boil the liquor at the temperature to which it has been heated, steam is evolved from the liquor. The upper portion of pipe 9, accordingly, acts as a gas lift pump supplementing the difference in pressure between vessel 1 and chamber 7 acting to circulate the warm solution upwardly through pipe 9 and introduce it into chamber 7. As a result of the evaporation of the warm liquor both in the upper portion of pipe 9 and in chamber 7, where the solution is contacted with an atmosphere in which the water vapor pressure is below the equilibrium vapor pressure of the solution in the pool in vessel 1 which rises upwardly through pipe 9, the liquor is concentrated and cooled and the cooled liquor flows downwardly from chamber 7 through pipe 8 and returns to and is mixed with the ammonium nitrate solution in vessel 1. Steam evolved from the liquor in the flashing chamber is condensed in condenser 12 and the vacuum in chamber 7 is maintained by removal of uncondensed gases by means of vacuum pump 13.

The distance at which flashing chamber 7 is placed above vessel 1 is equal to the barometric liquor height for the difference in pressure to be maintained between the liquid in vessel 1 and in chamber 7. The hydrostatic pressure head at the bottom of pipe 8 should be sufficiently greater than the difference in pressure between vessel 1 and chamber 7 that the circulating solution introduced into chamber 7 from pipe 9, after being cooled and evaporated, will be returned to vessel 1 as rapidly as it rises in pipe 9. As ammonium nitrate solution is formed by reaction of the nitric acid and ammonia gas introduced into vessel 1 and is concentrated by circulation through flashing chamber 7, a corresponding amount of ammonium nitrate solution overflows from vessel 1 through pipe 2 and, if desired, may be neutralized and evaporated to recover solid ammonium nitrate therefrom.

It has been found that the process and apparatus described above may be satisfactorily employed for the production of ammonium nitrate by introducing into the liquor in vessel 1, a nitric acid of 40% strength and ammonia gas in such proportions that about 1% free nitric acid is maintained in the solution in the vessel. It has been found satisfactory to maintain the temperature of the ammonium nitrate solution into which the nitric acid and ammonia gas are introduced at about 70° C. by maintaining a reduced pressure in chamber 7 of about 90 millimeters of mercury. Under such conditions of operation, a solution containing about 60% of ammonium nitrate may be readily and continuously withdrawn from vessel 1.

It is not to be understood, however, that my invention is in any wise limited to these specific conditions of operation. For example, nitric acid of a strength up to or exceeding 60% nitric acid may be used to advantage. The solution in vessel 1 may be maintained at a temperature from ordinary atmospheric temperature up to just below the boiling point of the solution but preferably it should be maintained at a temperature between 50° C. and about 10° C. below its boiling point at the pressure under which it is maintained in vessel 1. While it is preferred to maintain about 0.5% to 1% free nitric acid in the solution into which nitric acid and ammonia are introduced, the process may be satisfactorily operated with from 0.1% to 5% free nitric acid. By maintaining free acid in the solution the tendency for ammonia to pass unabsorbed through the solution is materially repressed. The use of high concentrations of free acid has the disadvantage of rendering the solution relatively corrosive and favors loss of nitric acid from the process, and on the other hand, it is increasingly difficult to insure the constant presence of free acid in the solution when but a slight acidity of the solution is maintained. Accordingly, it is preferred to operate, as described, with about 0.5% to 1.0% free acid continuously maintained in the solution into which the ammonia and acid are introduced. Nevertheless, if for any reason, it is desired to directly obtain either a strongly or a weakly acid solution, it is an advantage of this invention that the acid concentration may be varied widely without entailing relatively large losses of reactants. The pressure in vessel 1 should be greater than the pressure in the flashing chamber 7 but this difference in pressure may be relatively large or small. It is preferred to operate, however, so that the pressure difference is equivalent to the difference in the vapor pressure at the boiling point of the ammonium nitrate solution in vessel 1 at the pressure under which it is maintained in this vessel, and of the same solution at a temperature 20° C. or more below this boiling point. The pressure in flashing chamber 7, however, should be sufficiently high to preclude the solution being cooled low enough to cause crystallization of the ammonium nitrate. While either or both vessel 1 and flashing chamber 7 may be operated at a pressure greater or less than atmospheric, it is preferred to operate with vessel 1 at atmospheric pressure and the flashing chamber at a reduced pressure. Liquid ammonia may be introduced into vessel 1 through pipe 5 in place of gaseous ammonia, although it is preferable, when the ammonia is supplied as a liquid, to gasify it before use. Furthermore, the process and apparatus of this invention is applicable to the reacting of nitric acid and aqua ammonia and when such materials are to be employed, the use of this invention is particularly advantageous since it permits of conserving the heat of reaction and utilizing it for the evaporation of water introduced with the nitric acid and ammonia.

While the process of this invention has been particularly described and exemplified in connection with the reacting of ammonia and nitric acid, it is applicable to the production of ammonium salts in general and particularly ammonium sulfate by reaction of ammonia and sulfuric acid or ammonium phosphate from phosphoric acid and ammonia.

Accordingly, since numerous changes in carrying out the above process and in the construction set forth which embody the invention, may be made without departing from its scope, it is intended that all matter contained in the above description or shown in the accompanying drawing shall be interpreted as illustrative and not in a limiting sense.

I claim:

1. The process for the production of a reaction product which is normally a solid from components, at least one of which is readily volatilized and which undergo an exothermic reaction resulting in the formation of said product, which comprises introducing said components into a pool of liquid comprising a solution of the reaction product, and causing the components to react in said pool, thereby generating heat, maintaining said pool under a pressure above the vapor pressure of the solution, transferring a portion of said solution to a zone in which a pressure below the vapor pressure of the solution is maintained to thereby evaporate solvent from said solution, whereby the solution thus subjected to evaporation is cooled, and returning the thus cooled and concentrated solution to said pool whereby said pool is cooled and volatilization of said components therein is minimized.

2. The process for the production of an ammonium salt which comprises introducing an acid and ammonia into a pool of liquid comprising an aqueous solution of the corresponding ammonium salt, maintaining said pool under a pressure above the vapor pressure of the liquid therein, withdrawing a portion of the liquid heated by reaction of said acid and ammonia, subjecting the withdrawn liquid to a pressure below the vapor pressure thereof to cool and concentrate the same by evaporation of water therefrom, and returning the thus cooled liquor to said pool.

3. The process for the production of an ammonium salt which comprises continuously introducing an acid and ammonia into a pool of liquid comprising an aqueous solution of the corresponding ammonium salt, said acid and ammonia being introduced in proportions to maintain free acid present in said pool, maintaining the pool under atmospheric pressure, continuously circulating portions of the solution from and to the aforesaid pool, subjecting the circulating solution to a pressure below atmospheric to cool and concentrate it by evaporation of water therefrom and maintaining the pool at a temperature below the boiling point of the liquid therein by returning to the pool the thus cooled solution.

4. The process for the production of ammonium nitrate which comprises introducing nitric acid and ammonia into a pool of liquid comprising an aqueous solution of ammonium nitrate under a pressure above the vapor pressure of the solution, withdrawing a portion of the r sulting solution of ammonium nitrate heated by reaction of said nitric acid and ammonia, subjecting the withdrawn solution to a pressure below the vapor pressure of the heated solution to cool and concentrate the withdrawn solution by evaporation of water therefrom and returning the thus cooled solution to said pool.

5. The process for the production of ammonium nitrate which comprises continuously introducing nitric acid and ammonia into a pool of liquid comprising an aqueous solution of ammonium nitrate, continuously circulating portions of said solution from and to the aforesaid pool, subjecting the circulating solution to reduced pressure to cool and concentrate it by evaporation of water therefrom, and maintaining the aforesaid pool at a temperature below its boiling point by the return thereto of the thus cooled solution.

6. The process for the production of a solution of ammonium nitrate which comprises simultaneously and continuously introducing nitric acid and gaseous ammonia into a pool of ammonium nitrate solution under substantially atmospheric pressure in proportions to maintain about 0.5% to 1% free nitric acid in said pool, continuously withdrawing a portion of the solution from the pool, subjecting the withdrawn portion to a vacuum to evaporate water therefrom and cool it and maintaining the temperature of the aforesaid pool of ammonium nitrate solution at about 70° C. by returning thereto the thus cooled solution.

7. The process for the production of ammonium sulfate which comprises introducing sulfuric acid and ammonia into a pool of liquid comprising an aqueous solution of ammonium sulfate under a pressure above the vapor pressure of the solution, withdrawing a portion of the resulting solution of ammonium sulfate heated by reaction of said sulfuric acid and ammonia, subjecting the withdrawn solution to a pressure below the vapor pressure of the heated solution to cool and concentrate the withdrawn solution by evaporation of water therefrom and returning the thus cooled solution to said pool.

8. The process for the production of ammonium sulfate which comprises continuously introducing sulfuric acid and ammonia into a pool of liquid comprising an aqueous solution of ammonium sulfate, continuously circulating portions of said solution from and to the aforesaid pool, subjecting the circulating solution to reduced pressure to cool and concentrate it by evaporation of water therefrom, and maintaining the aforesaid pool at a temperature below its boiling point by the return thereto of the thus cooled solution.

9. In combination in an apparatus for the production of an ammonium salt, a reaction vessel, means for introducing an acid and ammonia into said vessel, a flash evaporator, a conduit directly communicating between said vessel and said evaporator and a return liquid conduit leading from the evaporator to within said vessel.

10. An apparatus for the production of an ammonium salt which comprises a vessel, means for separately introducing an acid and ammonia into the vessel, a chamber positioned at an elevation above the vessel, liquid circulating legs communicating between the interior of the vessel and the upper portion and the bottom respectively of the chamber, and means for maintaining a vacuum within said chamber.

11. In combination in an apparatus for the production and concentration of a reaction product from components, at least one of which is readily volatilized at atmospheric pressure, which comprises a reaction vessel maintained substantially at atmospheric pressure and adapted to contain a pool of said reaction product in solution in a solvent, means for introducing said components into said pool, a flash evaporator, means for maintaining a vacuum in said evaporator, a conduit directly communicating with said evaporator and said reaction vessel adapted to permit flow of solution from said vessel into said evaporator, and a second conduit communicating with said evaporator and said reaction vessel adapted to permit return of solution from said evaporator to said vessel.

12. The process for the production of ammonium nitrate which comprises continuously circulating an aqueous solution of ammonium nitrate through a plurality of stages in the first of which stages ammonia and nitric acid are reacted in contact with said solution under conditions of temperature and pressure which prevent substantial evaporation of water from said solution during the reaction of the ammonia and nitric acid and conserve in the solution the heat liberated by said reaction, and in another of said stages the heated solution of ammonium nitrate is passed into contact with an atmosphere in which the water vapor pressure is below the vapor pressure of the heated solution to evaporate water therefrom by the heat contained therein and to cool the same, and returning the solution thus concentrated and cooled by evaporation of water therefrom to the first mentioned stage for further reaction of ammonia and nitric acid, whereby the temperature of the solution in said first mentioned stage is maintained below the temperature at which substantial evaporation of water occurs.

13. The process for the production of an ammonium salt which comprises continuously circulating an aqueous solution of said ammonium salt through a plurality of stages in the first of which stages ammonia and an acid are reacted in contact with said solution under conditions of temperature and pressure which prevent substantial evaporation of water from said solution during the reaction of the ammonia and acid and conserve in the solution the heat liberated by said reaction, and in another of said stages the heated solution of ammonium salt is passed into contact with an atmosphere in which the water vapor pressure is below the vapor pressure of the heated solution to evaporate water therefrom by the heat contained therein and to cool the same, and returning the solution thus concentrated and cooled by evaporation of water therefrom to the first mentioned stage for further reaction of ammonia and acid, whereby the temperature of the solution in said first mentioned stage is maintained below the temperature at which substantial evaporation of water occurs.

14. The process of preparing a concentrated solution of ammonium nitrate which comprises reacting ammonia with a solution of nitric acid at a pressure greater than the vapor tension of the resulting solution of ammonium nitrate at the temperature produced by the reaction, passing off said solution of ammonium nitrate, and concentrating said last-mentioned solution by the evaporation thereof, at a pressure lower than that at which said reaction is effected, by the heat of the reaction of the ammonia with the nitric acid solution.

15. The process of preparing a concentrated solution of ammonium nitrate, which comprises continuously introducing ammonia and a solution of nitric acid through separate tubings into a container, where they are mixed and reacted; maintaining a pressure in said container greater than the vapor tension of the resulting solution of ammonium nitrate at the temperature produced by the reaction, while continuously passing off said solution of ammonium nitrate from said container; evaporating the last-mentioned solution, at a pressure inferior to that at which said mixing is effected, by the heat generated in said container; and continuously discharging the solution of concentrated ammonium nitrate thus prepared.

16. The process for the production of a solution containing ammonium nitrate by reaction of ammonia with an aqueous solution containing nitric acid while utilizing the heat of reaction of the ammonia and acid to evaporate water introduced with said solution of nitric acid, which comprises continuously cycling an aqueous liquor containing ammonium nitrate dissolved therein through a plurality of stages, in one of said stages reacting ammonia and nitric acid in said aqueous liquor to form ammonium nitrate under a pressure at which boiling of the liquor at the temperature to which it is heated by the heat of reaction liberated therein is prevented, and in a subsequent stage subjecting the thus heated liquor to a pressure sufficiently below the pressure in the first stage to cause the liquor to boil and water to be evaporated therefrom by said heat of reaction and returning to the first mentioned stage aqueous liquor cooled by said evaporation of water.

17. The process for the production of a concentrated solution of ammonium nitrate by reaction of ammonia with an aqueous solution of nitric acid and by utilizing the heat of reaction of said ammonia and nitric acid to evaporate water introduced with said solution of nitric acid, which comprises reacting ammonia and an aqueous nitric acid solution in an aqueous solution of ammonium nitrate while maintaining said aqueous solution of ammonium nitrate under a pressure at which boiling of the solution at the temperature to which it is heated by the heat of reaction liberated therein is prevented, withdrawing thus heated aqueous ammonium nitrate solution, and contacting the withdrawn solution with an atmosphere in which the water vapor pressure is below the water vapor pressure of the heated solution to evaporate water therefrom by said heat of reaction.

18. The process for the production of an ammonium salt which comprises reacting an acid and ammonia in an aqueous solution of said ammonium salt under conditions of temperature and pressure at which there is substantially no vaporization of water from the resulting solution at the temperature to which it is heated by the reaction of the acid and ammonia and there is no evaporation of water from said resulting solution, condensation of evaporated water and return of condensed water to said resulting solution, and thereafter subjecting the resulting solution while substantially at the temperature to which it is heated by reaction of said acid and ammonia to a pressure below the vapor pressure of the heated solution to evaporate water therefrom by means of the heat of the reaction of the acid and ammonia.

19. The process for the production of ammonium nitrate which comprises reacting nitric acid and ammonia in an aqueous ammonium nitrate solution under conditions of temperature and pressure at which there is substantially no vaporization of water from the resulting solution at the temperature to which it is heated by the reaction of the acid and ammonia and there is no evaporation of water from said resulting solution, condensation of evaporated water and return of condensed water to said resulting solution, and thereafter subjecting the resulting solution while substantially at the temperature to which it is heated by reaction of said nitric acid and ammonia to a pressure below the vapor pressure of the heated solution to evaporate water therefrom by means of the heat of the reaction of the acid and ammonia.

20. The process for the production of ammonium sulfate which comprises reacting sulfuric acid and ammonia in an aqueous ammonium sulfate solution under conditions of temperature and pressure at which there is substantially no vaporization of water from the resulting solution at the temperature to which it is heated by the reaction of the acid and ammonia and there is no evaporation of water from said resulting solution, condensation of evaporated water and return of condensed water to said resulting solution, and thereafter subjecting the resulting solution while substantially at the temperature to which it is heated by reaction of said sulfuric acid and ammonia to a pressure below the vapor pressure of the heated solution to evaporate water therefrom by means of the heat of the reaction of the acid and ammonia.

HERMAN ALBERT BEEKHUIS, Jr.